No. 894,325.

PATENTED JULY 28, 1908.

G. W. HURST.
HORSE RELEASER.
APPLICATION FILED MAY 13, 1907.

3 SHEETS—SHEET 1.

Witnesses
G. R. Thomas
F. G. Smith

Inventor
George W. Hurst
By Chandler & Chandler
Attorneys

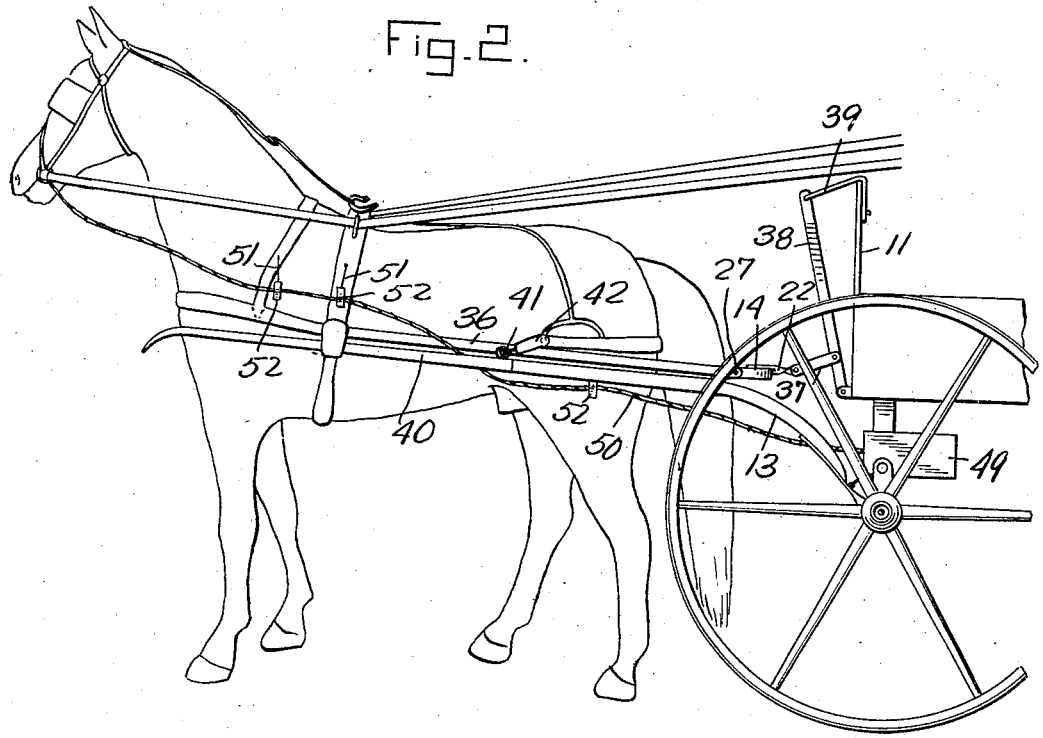
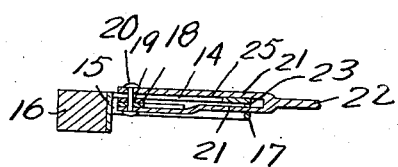
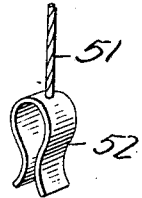
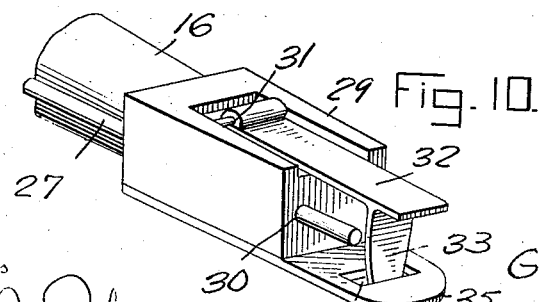

No. 894,325. PATENTED JULY 28, 1908.
G. W. HURST.
HORSE RELEASER.
APPLICATION FILED MAY 13, 1907.

3 SHEETS—SHEET 3.

Witnesses
G. R. Thomas
F. G. Smith

Inventor
George W. Hurst
By Chandlee Chandlee
Attorneys

UNITED STATES PATENT OFFICE.

GEORGE W. HURST, OF HAWTHORNE, NEVADA.

HORSE-RELEASER.

No. 894,325.　　　　Specification of Letters Patent.　　　Patented July 28, 1908.

Application filed May 13, 1907. Serial No. 373,456.

*To all whom it may concern:*

Be it known that I, GEORGE W. HURST, a citizen of the United States, residing at Hawthorne, in the county of Esmeralda, State of Nevada, have invented certain new and useful Improvements in Horse-Releasers; and I do hereby declare the following to be a full, clear, and exact description of the invention, such as will enable others skilled in the art to which it appertains to make and use the same.

This invention relates to horse releasers and has for its object to provide a releasing device of such character that the movement of the swingletree will not be interfered with and one which will be readily operable to release the horse in case occasion should present itself.

Aside from the provision of a novel form of releasing device for the animal I have provided a novel means for stopping the horse after he has been released from the vehicle. Heretofore said releasing devices have consisted merely in means for releasing the animal and after being so released he is allowed to run unrestrained.

The restraining device embodied in my invention is in the form of a weight which is normally supported within a tiltable box and is designed to be pulled from the box at the time the horse is released by means of a rope which leads from the weight to the bridle, the box being tilted at the time of dropping of the shafts of the vehicle so as to permit the weight to readily slide therefrom.

Figure 1:
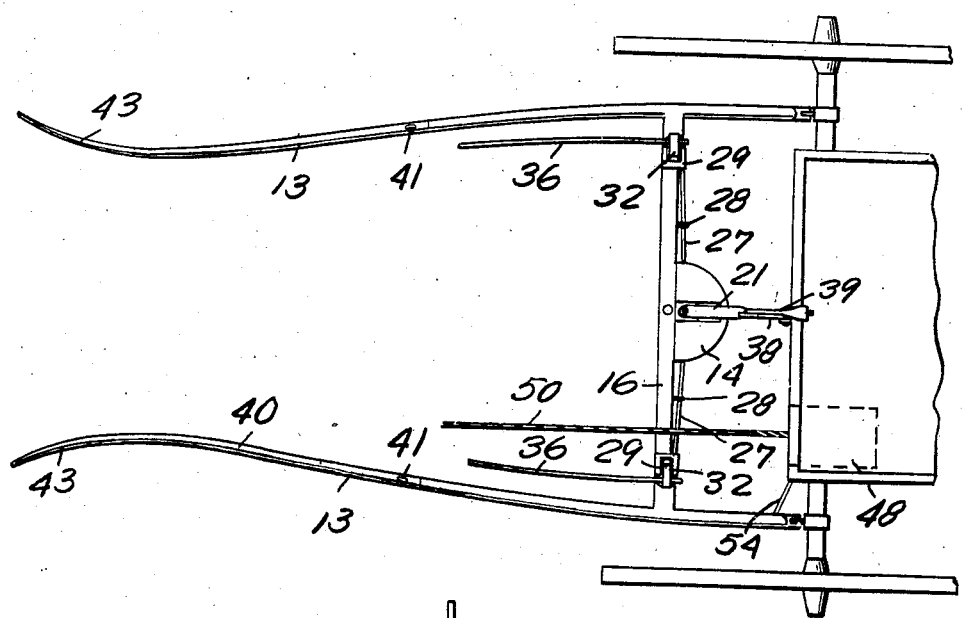
Figure 3:
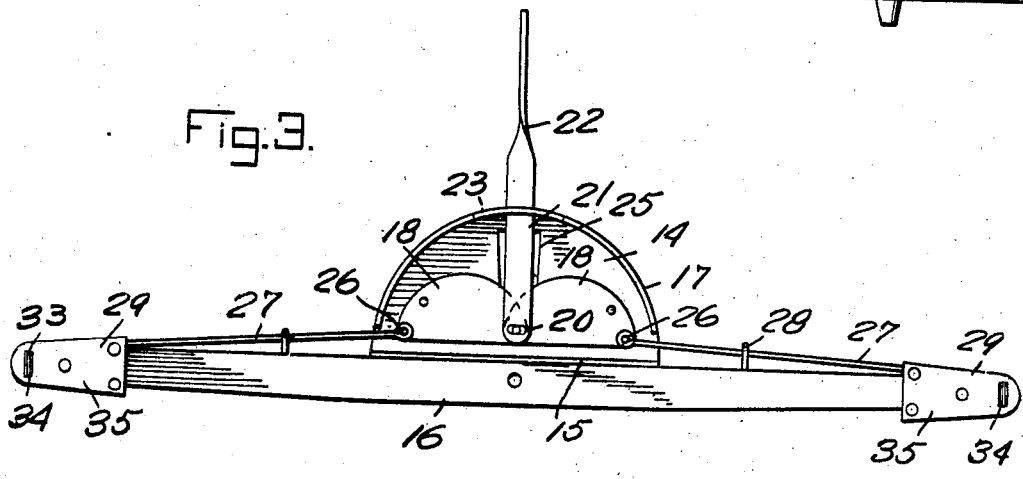
Figure 5:
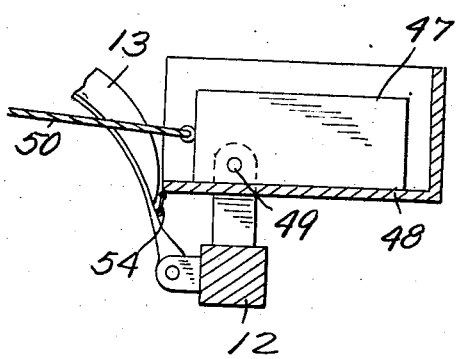
Figure 6:
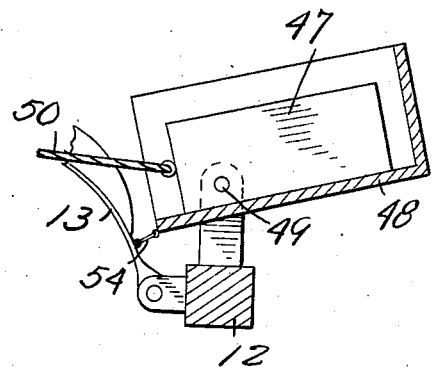
Figure 8:
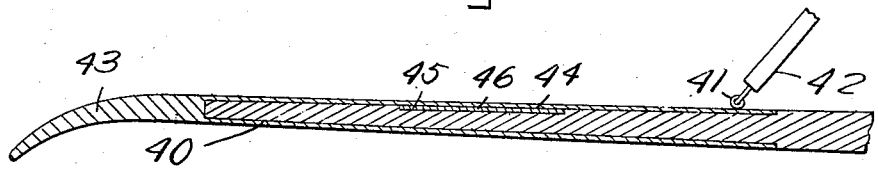
Figure 9:
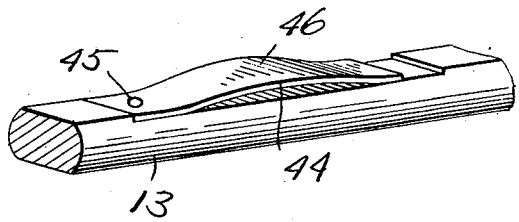

In the accompanying drawings, Figure 1 is a plan view of the mechanism showing the same applied to a buggy or other vehicle, Fig. 2 is a side elevation thereof applied, Fig. 3 is a bottom plan view of the releasing mechanism removed from the buggy, Fig. 4 is a vertical sectional view therethrough taken in a plane at right angles to the draft element upon which the mechanism is located, Fig. 5 is a detail sectional view through the weight receiving box showing the box in its normal position, Fig. 6 is a similar view showing the box tilted, Fig. 7 is a detail perspective view of one of the clips for retaining the rope which is connected to the weight, Fig. 8 is a detail vertical sectional view through a portion of one of the shafts of the vehicle, Fig. 9 is a detail perspective view of a portion of the shaft proper with the sleeve removed therefrom, and, Fig. 10 is a detail perspective view of one end of the swingletree.

In the drawings there is shown the forward portion of a buggy or other vehicle including the dashboard 11, an axle-tree 12, and shafts 13.

A semi-circular plate 14 is flanged as at 15 for the purpose of attachment to the rear face of a swingletree 16 and is also provided with a semi-annular flange 17 for a purpose which will be presently made apparent. Pivoted upon the under face of the semi-circular plate 14 at each side of the center thereof is a semi-circular disk 18 and these disks are designed to overlap at their forward ends and are slotted as at 19 for the passage of a bolt 20. This bolt also passes through the slotted ends of the spaced portions 21 of a bar 22, the said spaced portions being formed by a bifurcation in the bar. The slots in the disks correspond with the slots in the bar 22. One of the spaced portions of the bar extends above the circular plate 14 whereas the other spaced portion extends through a slot 23 formed in the flange 16 upon the said circular plate it being understood that this engagement of the bar through the slit permits of turning of the plate independently of the bar. There is a slot 25 in the plate in which the bolt 20 works and it will be understood that longitudinal movement of the bar 22 will result in the oscillation of the plates and further that the bar being pivoted to the plates and being extended through the slot as above stated, the swingletree may have a turning movement entirely independent of the bar.

Pivotally connected as at 26 to the ends of the plates 18 opposite their apertured ends are rods 27 which work in guides 28 upon the rear face of the swingletree and normally project at their ends through ferrules 29. One of said ferrules 29 is engaged upon each end of the swingletree and is provided with a bore 30 for the purpose above stated and pivoted to the upper face of each ferrule as at 31 is a latch 32 which has a portion 33 extending at right angles thereto at a point beyond the end of the swingletree and the ferrule thereon and normally engaged through a slot 34 formed in a plate 35 which projects beyond the end of the ferrule and from the under face thereof. It will be understood that the latch is formed of resilient sheet metal and that consequently it may be manually disengaged from its keeper, namely the plate 35. The ends of the rods project as stated through the ferrules, and to the portions 33 of the latches, and the traces 36 of a set of harness are engaged with the ends of the respective rods and the latches afterwards engaged with their keepers to prevent the traces slipping from their engagement with the rods.

From the foregoing description of my invention it will be observed that rearward movement of the bar which is connected to the plates 18, will result in the rods being retracted from engagement with the traces and consequently the traces will be released for the purpose of releasing the horse. In order that this rearward movement of the bar may be accomplished from within the vehicle, a rod 37 is pivotally connected with the rear end of the bar and to a lever 38 which is pivoted at its lower end to the lower end of the dashboard and extends upwardly to a point coincident with the upper end of the dashboard. A strap 39 is connected with the upper end of the lever and this strap is passed over the upper end of the dashboard and secured at any suitable point upon the rear face thereof in such position that it may be readily reached by an occupant of the vehicle. A rearward pull upon the strap will of course swing the lever and, through the instrumentality of the rod, the bar will be moved in a corresponding direction.

In order that the horse may be completely released from the vehicle I have provided a novel construction of shaft which will now be described. The shafts 13 are of the usual construction except that they are flattened upon their upper and lower sides and a sleeve 40 is provided for each shaft and is designed to fit snugly over the end thereof. At its rear end, each of these sleeves is provided with a loop 41 for the attachment of the hold-back strap 42 of the harness and the sleeve has at its forward end a forward extension 43 which completes the shaft. The sleeves fit the shafts however not so tightly but that they may be disengaged therefrom under conditions to be presently described and in order that they may be held against rattling, a leaf spring 44 is secured as at 45 upon each of the shafts adjacent its forward end and extends rearwardly and above the shafts in spaced relation thereto, the intermediate portion of the spring being bowed upwardly as at 46 so that when the sleeve 40 is engaged with the shaft, the bowed portion of the spring will be compressed and the sleeve held against movement.

From the foregoing it will be understood that when the traces have been disengaged from the swingletree, the only connection between the harness and the shafts or other portion of the vehicle is the hold-back strap and the pull exerted upon this strap will serve to disengage the sleeves from the shafts and in this manner completely release the horse from the vehicle.

In connection with my releasing means I have provided a restraining device which is in the form of a weight 47 which under normal conditions is received in a box 48 pivoted as at 49 upon the axle tree 12. A rope 50 leads from this weight to the bridle of the harness with which it is connected by means of a snap hook. Loosely suspended from the hame, the back band and the traces, by means of cords or chains 51, are spring clips 52 formed by bending a strip of spring metal to form a bowed portion and outwardly flared ends. The rope of course hangs loose between the spring clips and it will be understood that as soon as the horse is released, a pull is exerted upon the ropes and consequently upon the weight 47. The tendency is of course to pull the weight from its box 48 and this tendency is aided by a flexible connection 54 between one of the shafts and the forward edge of the box whereby the box will be forwardly tilted to discharge the weight as soon as the shafts are dropped.

What is claimed is—

1. In a horse releaser, the combination with a whiffle tree, shafts, harness traces, and the hold-back strap of a harness, of a plate secured to the whiffle tree, semi-circular plates pivoted upon the under side of the first mentioned plate, a flange formed upon the first mentioned plate and provided with a slot, a bar extending through the slot, a bolt engaged through the end of the bar and the overlapping ends of the plates, trace holding devices located at the ends of the whiffle tree, rods pivoted to the semi-circular plates and extending through the trace holding devices, means whereby the bar may be pulled rearwardly, sleeves removably engaged upon the ends of the shafts, and loops carried by the sleeves for the attachment of the hold-back straps of the harness.

2. In a horse releaser, the combination with a whiffle tree, shafts, harness traces, and the hold-back strap of a harness, of a plate secured to the whiffle tree, semi-circular plates pivoted upon the under side of the first mentioned plate, a flange formed upon the first mentioned plate, and provided with a slot, a bar extending through the slot, a bolt engaged through the end of the bar and the overlapping ends of the plates, trace holding devices located at the ends of the whiffle tree, rods pivoted to the semi-circular plates and extending through the trace holding devices, means whereby the bar may be pulled rearwardly, sleeves removably engaged upon the ends of the shafts, loops carried by the sleeves for the attachment of the hold-back straps of the harness, and bowed leaf springs secured to the shafts and adapted to be compressed between the shafts and the sleeves thereon whereby the sleeves will be held against loose movement upon the shafts.

3. In a device of the class described, the combination with a vehicle including shafts, and means for releasing a horse from the shafts, of a tiltable box supported upon the vehicle, flexible connection between the box and the shafts whereby the box will be tilted when the shafts are dropped, a weight normally received in the box, and a rope connected with the weight and with the bridle of the harness upon the horse.

In testimony whereof, I affix my signature, in presence of two witnesses.

GEORGE W. HURST.

Witnesses:
JAS. BESHEARS,
H. H. HAMLIN.